ATTORNEY

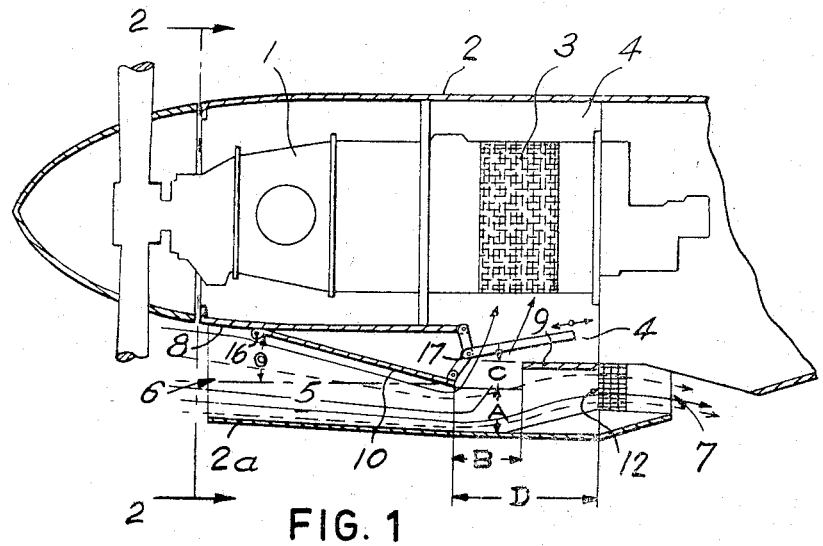

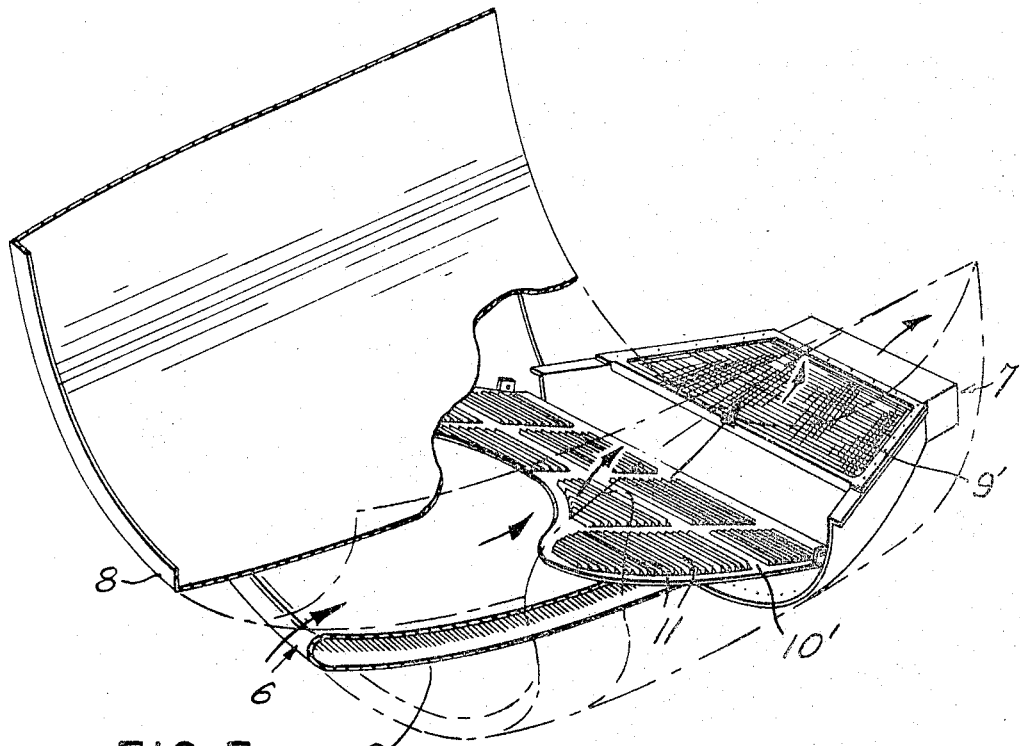
FIG. 5
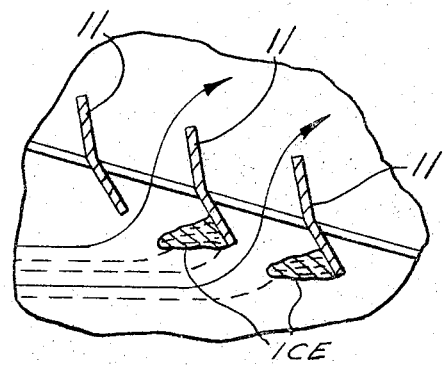
FIG. 6
INVENTORS
Gudmundur Peter PETERSON
Barry Winston LEES
ATTORNEY INVENTORS
Gudmundur Peter PETERSON
Barry Winston LEES

3,329,377
PROTECTION FOR AIRCRAFT ENGINES AGAINST SNOW, ICE AND AIRBORNE PARTICLES

Gudmundur Peter Peterson, St. Hillaire, Quebec, and Barry Winston Lees, Ville Jacques Cartier, Quebec, Canada, assignors to United Aircraft of Canada Limited, Quebec, Quebec, Canada
Filed Oct. 11, 1965, Ser. No. 494,973
14 Claims. (Cl. 244—53)

The present invention relates to a method and an installation for preventing the ingress of super-cooled water, of ice, snow and other debris to the air intake of an aircraft engine.

The invention is applicable in general terms to any aircraft engine requiring atmospheric air for combustion, but it is more particularly applicable to engines having centrally located air intakes, for example a gas turbine propeller driven aircraft engine fitted with a cylindrical screened air intake disposed within an annular plenum generally central of the length of the engine nacelle.

One of the requirements of aircraft engines, or power plants, is the capability to operate in all normal weather conditions including snow storms, hail storms and combinations thereof commonly called "mixed icing" conditions.

Such conditions result in the accumulation of ice or slush in the air intake or air induction system of the engine and, unless protection measures are taken, can lead to serious loss of power and/or damage to the engine.

In addition to the accumulation of solid forms of atmospheric water, other debris in the atmosphere can cause a similar hazard, for example sand, stones, water spray, and birds, and the present invention has as an object the reduction or avoidance of such hazards.

Conventional protection methods and installations are many and various. For example, debris traps have been installed in certain aircraft engines, sometimes in an annular duct around the engine where such debris is mechanically deflected by impingement against protecting vanes, and sometimes in the floor of the air intake, but in the former case the arrangement is not sufficiently effective, and in the latter case, only very heavy objects such as tools will be collected. Heating systems of various forms have been used to warm the intaken air so as to melt ice and snow, but such systems are complicated and expensive both in capital cost and in fuel consumed. Again it is conventional to spray alcohol or other de-icing fluid into the intaken air, but this is again expensive due to the capital cots of pumps, etc. and in the cost of alcohol consumed.

It is, therefore, another object of the present invention to provide a method and means for protection against atmospheric super-cooled water, ice, snow and debris which is both effective and economic.

It is a subsidiary object to devise such a method and means which are particularly adaptable to gas turbine engines having centrally located air intake plenums.

According to one aspect of the invention, there is provided a method of preventing ingress of ice, snow and other debris to the air intake of an aircraft engine comprising the steps of confining incoming air within a passage extending in the general direction of flight so as to cause part of the incoming airstream and particles of greater density than air carried by the airstream to pass in a substantially unimpeded path through the duct for discharge to the atmosphere, and withdrawing air for said intake from a side opening in the duct so that the latter air is caused to turn through a substantial angle away from the direction of flight thereby preferentially rejecting debris particles of higher inertia than the carrier airstream.

The incoming air may be divided into the two said parts partly with the aid of an air deflecting surface which is situated upstream of said opening and extends rearwardly and inwardly within said duct. The airstream may be accelerated as it passes between a leading and a trailing edge of the surface.

According to another aspect of the invention, there is provided, in an aircraft engine having an air intake, an installation for reducing ingress of super-cooled water, ice, snow and other debris to said intake comprising a duct extending generally longitudinally of the engine and having at least one side wall, a forward facing open inlet at one end and a discharge outlet at the other end, an air deflecting surface in said duct extending rearwardly and inwardly from said side wall over part of the duct cross-section so as to confine incoming air to a passage of reduced cross-section within said duct, said passage extending without sharp bends between said inlet and said outlet, and a side opening in said duct side wall downstream of the junction of said side wall and said deflecting surface, said opening communicating with said intake whereby air passing to said intake is deflected through a substantial angle around said deflecting surface whereas remaining air together with material of greater inertia passes without substantial deflection to said discharge outlet.

In one such form of the installation, the duct may be arranged to extend generally parallel to the engine and is bounded on the engineward side by a surface including a forward surface portion which follows the general contour of the engine, and a deflecting surface portion which extends rearwardly and inwardly from said forward surface portion towards the opposite side of the duct and terminates at a trailing edge which is spaced from said other side of the duct, said side opening being arranged in said engineward surface downstream of said deflecting surface portion.

In another form of the invention, the installation comprises within said duct a pair of baffles having leading and trailing edges, said baffles being spaced transversely from the borders of the duct and from each other and arranged to slope rearwardly and inwardly so as to leave between their trailing edges a central passage in said duct of reduced cross-section, guide means spaced rearwardly from said baffles and arranged to confine and guide part of the airstream passing through said central passage to said discharge outlet, and to guide part of the airstream flowing transversely around said trailing edges towards the air intake of the engine.

Having thus generally described the invention, the construction, method of operation and advantages will be further apparent from the following description of preferred embodiments illustrated in the accompanying drawings, in which:

FIGURE 1 is a diagrammatic, longitudinal, sectional view of an aircraft engine and nacelle;

FIGURE 2 is a diagrammatic front view of the embodiment of FIGURE 1;

FIGURE 5 is a partly exposed perspective view of the embodiment of FIGURE 3;

FIGURE 6 is an enlarged view of some of the louvres shown in FIGURE 3, showing ice formation;

In the drawings, similar parts are given the same references, modified parts being indicated with a prime.

Figure 3:
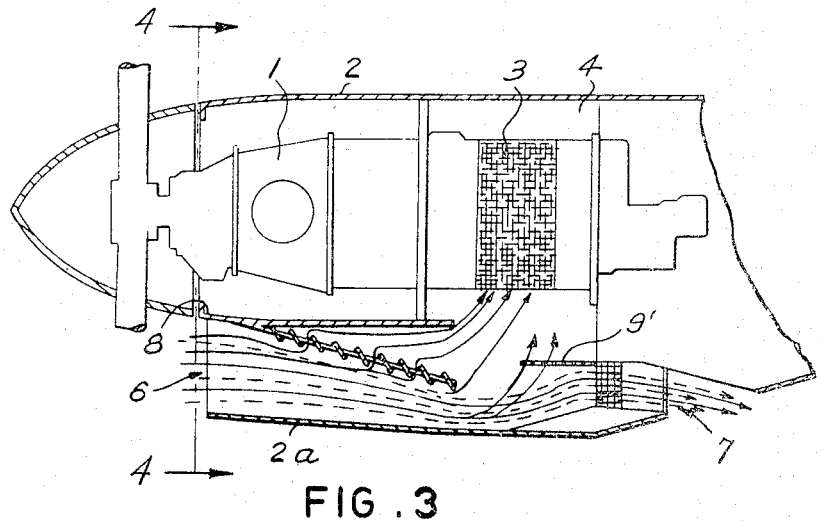
FIGURE 3 is a view similar to FIGURE 1 of a preferred modification of the embodiment of FIGURE 1.
Figure 4:
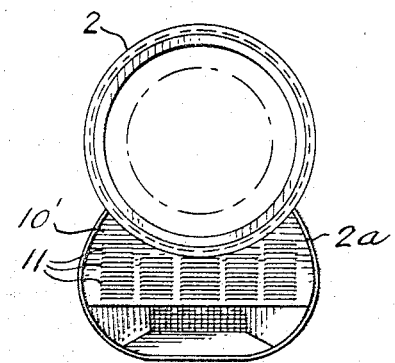
FIGURE 4 is a diagrammatic front view of the embodiment of FIGURE 3.

Referring to FIGURES 1 and 2, there is shown a propeller driven gas turbine engine 1 housed within a nacelle 2 and fitted with a centrally located air intake 3 protected by a covering screen. The intake 3, which is of cylindrical shape, is disposed within an annular plenum or air chamber 4, and it is apparent that any debris such as snow or frozen water which is allowed to accumulate in quantity in the plenum 4 will accumulate on the screen of intake 3 and tend to block it, with deleterious effect upon the performance of the engine.

Beneath the engine 1 and within the nacelle 2, and, as shown, formed by a bulge or sub-nacelle 2a of nacelle 2, is an air duct 5, having an open forwardly directed air inlet 6 and a rearwardly directed discharge outlet 7. The duct 5 extends generally longitudinally of, and parallel to, the engine 1.

The lower and side surfaces of the duct 5 are provided by walls of sub-nacelle 2a, which are of low aerodynamic impedance, whereas the upper or engineward surface of the duct 5 may be considered to be of three parts: a forward portion 8 of low aerodynamic impedance formed by part of the engine cowling (shown more clearly in FIGURE 5), a rearward portion 9 which may be straight as shown or of smooth curvature, and a vane 10.

The vane 10 extends, from a junction with forward portion 8, downwardly and rearwardly into duct 5 so as to leave a narrow throat of vertical dimension A between its trailing edge and the floor of the duct 5. The engine cowling forming a rearward extension 8a of forward surface portion 8 extends above vane 10 to a trailing edge substantially in the same vertical plane as the trailing edge of vane 10 so as to leave an opening of longitudinal dimension B in the upper side or roof of the duct 5, the opening communicating directly with the annular intake plenum 4.

The purpose of the vane 10 is to divide the incoming airstream into two parts. Part of the airstream passes in a substantially unimpeded path in the passage of reduced cross-section provided between the vane 10 and the floor of the duct, and is compressed and accelerated as it passes under the trailing edge of vane 10. Particles of debris such as snow and frozen water particles which have a higher inertia than the carrier air stream will follow the substantially straight path to the discharge outlet 7, there to be expelled into the atmosphere.

Due in part to the relatively lower pressure prevailing in annular plenum 4, a part of the incoming airstream will be drawn into the plenum through the side opening in the upper side or roof of the duct. In order to pass through this opening, that part of the airstream is forced to make a sharp upward turn under the trailing edge of vane 10 and a relatively insignificant proportion of the debris will be capable of undergoing this turn, due to the greater inertia of the particles, the major proportion remaining in the through-going airstream.

The paths of the two parts of the airstream are shown in FIGURE 3 which illustrates a modification of the installation of FIGURES 1 and 2 in which vane 10′ is provided with louvres 11, which are shown in greater detail in FIGURES 5 and 6.

In the latter modification, the part of the airstream which is directed to the plenum 4 passes in part through the passages between the louvres 11, but in this case the air is forced to turn through an S bend so that particles of greater inertia will be preferentially rejected from that part of the airflow and will again continue to the discharge outlet 7. However, this modification allows more air to pass to plenum 4 in fair weather.

In the embodiment of FIGURES 3 to 6, the rearward portion 9′ of the upper surface of duct 5 is foraminous, preferably taking the form of a perforated screen as shown in FIGURE 5. This again allows more air into the plenum 4 in fair or average weather conditions.

In super-cooled water conditions, the louvres 11 and the screen portion 8′ gradually become iced up as shown specifically in FIGURE 6, which also illustrates the preferred bent shape of the louvres, which slows down the rate of icing. When fully coated with ice, the vane 10′ and screen 9′ operate in identical manner with vane 10 and surface 9 of FIGURES 1 and 2. The proportion of air deflected into the plenum chamber is decreased but at the same time the effectiveness of the inertial separation is increased since all the air passes under vane 10′ resulting in increased airstream velocity.

Preferably the angle of depression of vanes 10, 10′ of FIGURES 1 and 3 is adjustable, to provide the correct division of the airstream through the duct. This may be achieved by providing a hinged joint at the junction of the vane with cowling portion 8 as shown at 16 in FIGURE 1, together with any suitable control mechanism as at 17. The angle of the louvres 11 may also be made adjustable. The vanes 10, 10′ may, if desired, be swung up to the roof of the duct to clear the latter when protection is not desired.

It has been found that the ratio between the part of the airstream deflected into plenum 4 and the part discharged to the atmosphere should not be greater than 5:1 and preferably should be kept within the range 2.5:1 to 3.5:1. At ratios above 5:1 more than an acceptable amount of snow may be allowed into the plenum 4 in snow conditions. The above ratio will be dependent upon many variables such as forward speed, but the geometry of the installation is also important.

The following table shows dimensions in inches of the duct components A, B, C, D, E, F, G, φ, marked in FIGURE 1, in three different test nacelles fitted with installations in accordance with the invention, which provide the correct air-stream ratio described above, and which led to satisfactory operation in simulated snow and hail storms, including super-cooled water conditions, and showed equally good operation with substantially no icing in test flights when compared with a conventional alcohol anti-snow installation.

|                | A    | B | C | D    | E  | F  | G     | φ   |
|----------------|------|---|---|------|----|----|-------|-----|
| Test Nacelle 1 | 4⅜   | 5 | 2 | 13   | 75 | 22 | 13¼   | 16° |
| Test Nacelle 2 | 5⅜   | 4 | 2 | 14½  | 96 | 20 | 13¼   | 20° |
| Test Nacelle 3 | 3⅝   | 4 | 2 | 14   | 70 | 23 | 12¾   | 23° |

E is the free area of the throat under the trailing edge of vane 10, in square inches.

It is convenient to locate the oil cooler for the engine or power plant in the discharge outlet 7 of the duct 5 as shown at 12 in FIGURE 2. The oil cooler should not obstruct the outlet unduly.

The forward or leading edge of the rearward upper surface portion 9, 9′ is vertically spaced from the trailing edge of the vane 10, 10′ by distance C (FIGURE 1) to provide a stepped opening to the plenum 4, thus increasing the angle through which the plenum air is deflected. As shown, the step is less than the distance between the trailing edge of vane 10, 10′ and the trailing edge of the cowling portion 8a. It is apparent that if the vane 10 is a plate or sheet, the space between vane 10 and the cowling portion 8a above serves no necessary purpose and accordingly, the cowling need not extend rearwardly of the junction with vane 10 (in FIGURE 1) or alternatively, the space between trailing edges of vane 10 and portion 8a may be closed off.

Figure 7:
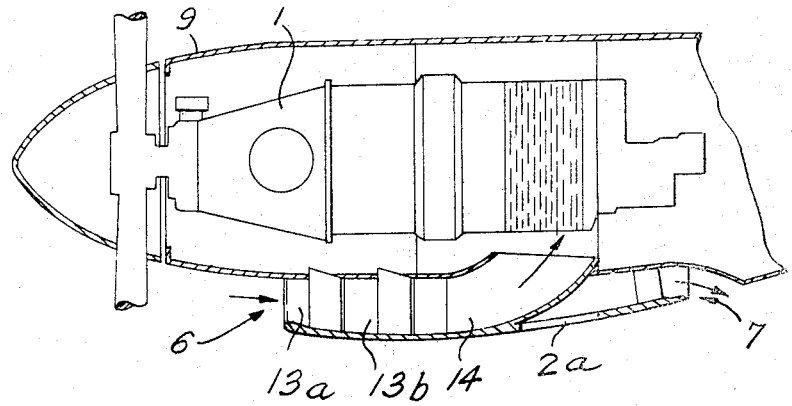
FIGURE 7 is a view similar to FIGURE 1 of a different embodiment of the invention.
Figure 8:
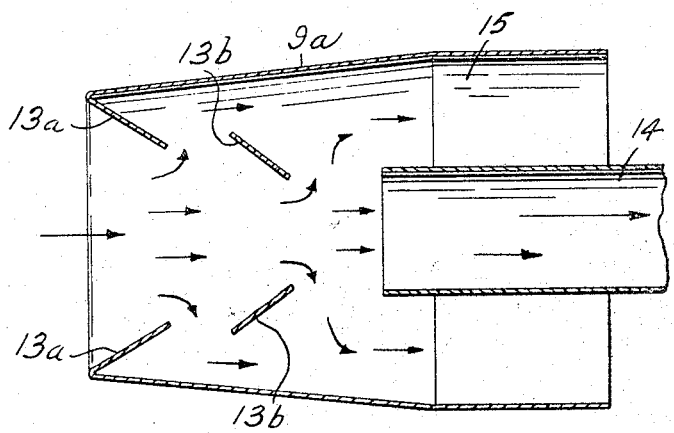
FIGURE 8 is a schematic plan view of the embodiment of FIGURE 7.

FIGURES 7 and 8 illustrate an alternative form of installation in accordance with the invention, in which the vane 10 is replaced by two rows of baffles 13a, 13b. The baffles extend vertically across the duct 5 and slope inwardly towards the rear of the duct to leave a central through passage between their trailing edges.

Guide plates 14 confine that part of the incoming airstream which passes centrally between the baffles 13a, 13b and conduct it in a substantially straight path to discharge outlet 7.

A peripheral passage 15 is formed between the guide plates 14 and the sides of duct 5, which passages communicates with intake plenum 4, and into which passage is deflected part of the airstream directed to the intake, due in part to the relatively lesser pressure prevailing in the plenum 4. Such air is deflected around the trailing edges of the baffles 13a, 13b and is forced to make a substantially sharp S bend. Particles of debris of higher inertia than the carrier air are as in the other embodiments preferably rejected from the deflected part of the airstream.

The baffles 13a, 13b may be fixed or may be pivotable to allow adjustment of the ratio of deflected air to discharged air, which ratio is preferably within the limits above described. They may, if desired, be provided with louvres or be made of screen or perforated or slotted material so as to increase airflow to the plenum in fair weather.

It is apparent that similar effects may be obtained by arranging the baffles horizontaly, instead of vertically, or by replacing guide plates 14 by a centrally disposed tube and arranging the baffles 13a, 13b as annular surfaces of frusto-conical general configuration.

Further variations will be readily apparent to one skilled in the art, within the scope of the invention.

We claim:

1. In an aircraft engine provided with an air intake, an installation for reducing ingress of super-cooled water, ice, snow and other debris to said intake comprising a duct extending generally longitudinally of the engine and having at least one side wall, a forward facing open inlet at one end and a discharge outlet at the other end, an air deflecting surface in said duct extending rearwardly and inwardly from said side wall over part of the duct cross-section so as to confine incoming air to a passage of reduced cross-section within said duct, said passage extending without sharp bends between said inlet and said outlet, and a side opening in said duct side wall downstream of the junction of said side wall and said deflecting surface, said opening communicating with said intake whereby air passing to said intake is deflected through a substantial angle around said deflecting surface whereas remaining air together with material of greater inertia passes without substantial deflection to said discharge outlet, wherein said deflecting surface portion is pivotable so as to allow adjustment of the ratio of air directed to said discharge end and to the engine intake.

2. A method of preventing ingress of super-cooled water, ice, snow and other debris to the air intake of an aircraft engine comprising the steps of confining incoming air within a passage extending in the general direction of flight so as to cause part of the incoming airstream and particles of greater density than air carried by the airstream to pass in a substantially unimpeded path through the duct for discharge to the atmosphere, and withdrawing air for said intake from a side opening in the duct so that the latter part of the air is caused to turn through a substantial angle away from the direction of flight thereby preferentially rejecting debris particles of higher inertia than the carrier airstream wherein the incoming air is adjustably divided into the two said parts partly with the aid of an air deflecting surface which is pivoted upstream of said opening so as to slope rearwardly and downwardly within said duct with adjustable angle.

3. An installation as claimed in claim 1 wherein said duct is arranged to extend generally parallel to the engine and is bounded on the engineward side by a surface including a forward surface portion which follows the general contour of the engine, and a deflecting surface portion which extends rearwardly and inwardly from said forward surface portion towards the opposite side of the duct and terminates at a trailing edge which is spaced from said other side of the duct, said side opening being arranged in said engineward surface downstream of said deflecting surface portion.

4. An installation as claimed in claim 3 wherein said engineward surface also includes, downstream of said opening, a rearward surface portion which is spaced in the rearward and engineward directions from said trailing edge.

5. An installation as claimed in claim 4 wherein said forward surface portion terminates at said side opening substantially in the cross-sectional plane of said trailing edge but spaced in said plane in the engineward direction from said trailing edge and from said rearward surface portion.

6. An installation as claimed in claim 5 wherein said deflecting surface includes a plurality of parallel louvres arranged in staggered formation with the trailing edge of one louvre overlapping the leading edge of the next adjacent downstream louvre so that air passing between the louvres is directed through an S bend.

7. An installation as claimed in claim 6 wherein said rearward surface portion is foraminous.

8. An installation as claimed in claim 7 wherein said duct is arranged below the engine, the lower side of the duct being formed by the lower boundary of an engine nacelle.

9. An installation as claimed in claim 7 wherein an oil cooler for the engine is located in the duct near its discharge end but without extending over the whole cross-section of said duct.

10. In a gas turbine propeller driven aircraft engine surrounded by a nacelle and fitted with a cylindrical screened air intake disposed within an annular plenum generally central of the length of the engine nacelle, an installation for reducing ingress of super-cooled water, ice, snow and other debris caused by the atmospheric air, to the intake comprising: an air duct, disposed below the engine, having a continuous lower surface of low aerodynamic impedance constituted by part of said nacelle, said duct extending generally longitudinally of and parallel to the engine and having a forwardly directed open air inlet at its forward end and a discharge outlet at its rearward end, the duct having an upper surface including a forward portion constituted by a cowling of low aerodynamic impedance following the general contour of the engine, a deflecting vane extending rearwardly and downwardly from an intermediate point along said forward portion, towards said lower surface and terminating at a trailing edge spaced from said lower surface to provide a passage in the duct of reduced cross-section, and a rearward surface portion spaced rearwardly and upwardly from said trailing edge and spaced rearwardly and downwardly from the rearward end of said forward portion so as to leave therebetween a stepped opening, said opening communicating with said annular intake plenum whereby a portion of the airstream entering at said inlet is deflected through a substantial angle of turn around said trailing edge into said opening, and the remainder of said airstream is caused to continue substantially unimpeded to said discharge outlet, ice particles, snow and other debris of inertia greater than the carrier airstream remaining preferentially in said remainder.

11. An installation as claimed in claim 10 wherein said vane is louvred.

12. An installation as claimed in claim 11 wherein said rearward surface portion comprises a foraminous screen.

13. An installation as claimed in claim 10 wherein said vane is pivotable, enabling adjustment of the ratio of said deflected part of the airstream to said remainder.

14. An installation as claimed in claim 10 wherein said vane is so dimensioned and arranged with respect to said duct and said stepped opening that at normal aircraft forward speed and intake the ratio of said deflected part of the airstream to said remainder is less than 5:1.

References Cited

UNITED STATES PATENTS

| | | | |
|---|---|---|---|
| 2,600,302 | 6/1952 | Kinsella | 244—134 X |
| 3,109,610 | 11/1963 | Quenzler et al. | 244—53 X |
| 3,148,043 | 9/1964 | Richardson et al. | 55—306 |

FOREIGN PATENTS 124,101  3/1947  Australia.

WILTON BUCHLER, *Primary Examiner.*

B. BELKIN, *Assistant Examiner.*